A. T. BROWN.
TYPE WRITING MACHINE.
APPLICATION FILED JUNE 29, 1904.

935,776.

Patented Oct. 5, 1909.
5 SHEETS—SHEET 3.

Witnesses
E. M. Wells
J. B. Deeves

Inventor
Alexander T. Brown
By his Attorney
Jacob Felbel

A. T. BROWN.
TYPE WRITING MACHINE.
APPLICATION FILED JUNE 29, 1904.

935,776.

Patented Oct. 5, 1909.
5 SHEETS—SHEET 5.

Witnesses
E. M. Wells.
J. B. Deevs.

Inventor
Alexander T. Brown
By his Attorney
Jacob Felbel

UNITED STATES PATENT OFFICE.

ALEXANDER T. BROWN, OF SYRACUSE, NEW YORK.

TYPE-WRITING MACHINE.

935,776.  Specification of Letters Patent.  Patented Oct. 5, 1909.

Application filed June 29, 1904. Serial No. 214,625.

*To all whom it may concern:*

Be it known that I, ALEXANDER T. BROWN, citizen of the United States, and resident of Syracuse, in the county of Onondaga and State of New York, have invented certain new and useful Improvements in Type-Writing Machines, of which the following is a specification.

My invention relates to typewriting machines and it consists in certain features of construction and combinations of parts which will be fully set forth herein and particularly pointed out in the claims.

One embodiment of my invention is illustrated in the accompanying drawings, in which—

I have illustrated my invention as applied to a front-strike typewriter, but many of the features thereof are also applicable to other sorts of typewriters.

The base portion of the main frame of the machine here illustrated comprises side plates 1, a back plate 2, a shelf 3 and a transverse partition 4. Posts 5 rising from the said base portion support a top plate 6 upon which the carriage is mounted. The keys 7 have their stems pivoted to arms 8 projecting from rock shafts 9, which are journaled at their forward ends in frame plates 10 and at their rear ends in the partition 4. Each of said rock shafts carries an arm 11, which is connected by a link 12 to one arm 13 of a three armed sub-lever, another arm 14 of which is connected by a link 15 to a type bar 16 which carries at its outer end two types 17 and 18. The sub-levers are pivoted in hangers 19 which are secured by screws 20 to a fixed segment 21 which is rigidly mounted in the main frame. The type bars 16 are journaled by ball bearings on a segment 22, which is supported by arms 23 for an up and down case shift motion.

The mechanism thus far described is not claimed herein, as such mechanism forms the subject-matter of other applications of mine copending herewith.

Figures 1, 2:
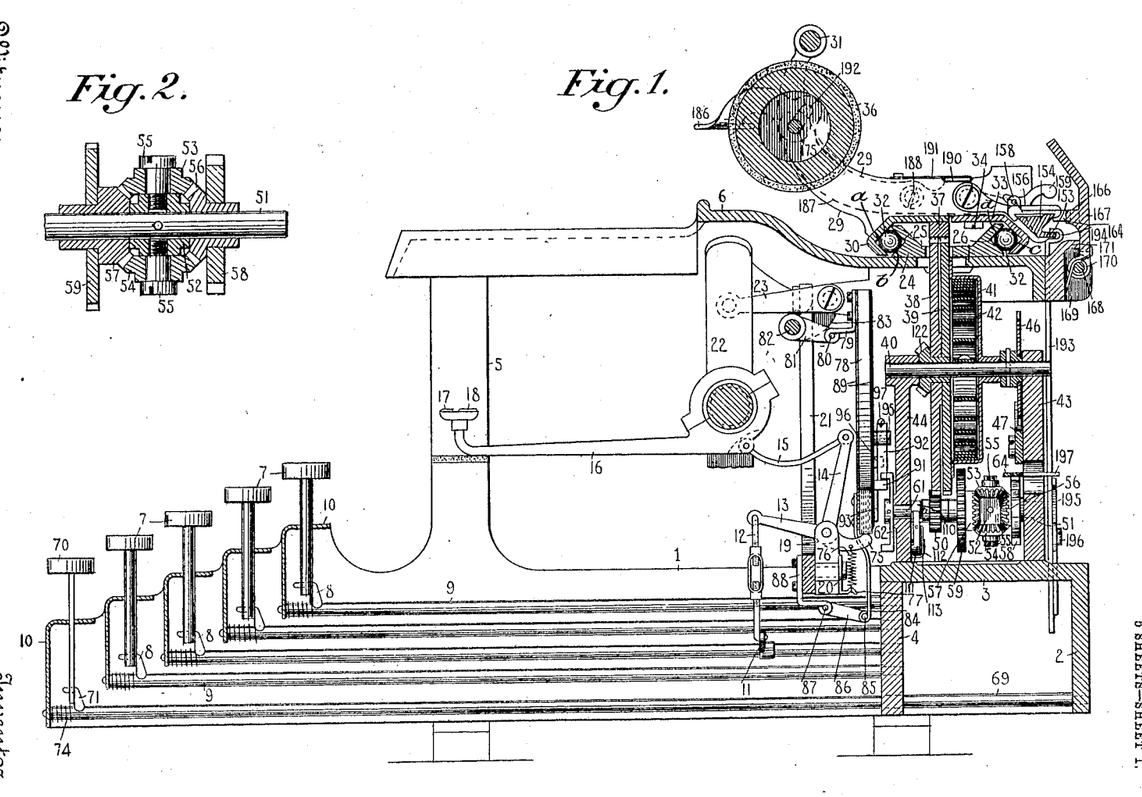
Figure 1 is a longitudinal sectional view of a typewriting machine.
Fig. 2 is a sectional view through the epicycloidal train of the escapement mechanism.
Figure 3:
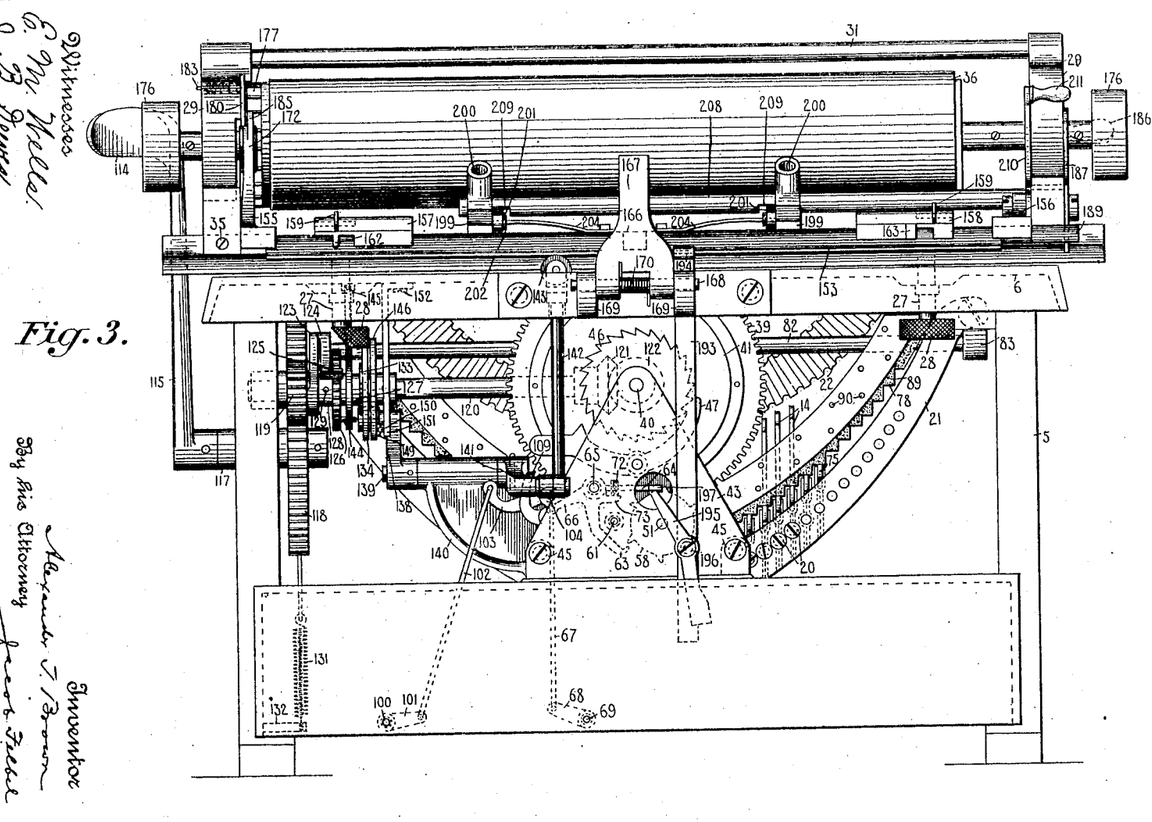
Fig. 3 is a rear elevation of the machine.
Figure 4:
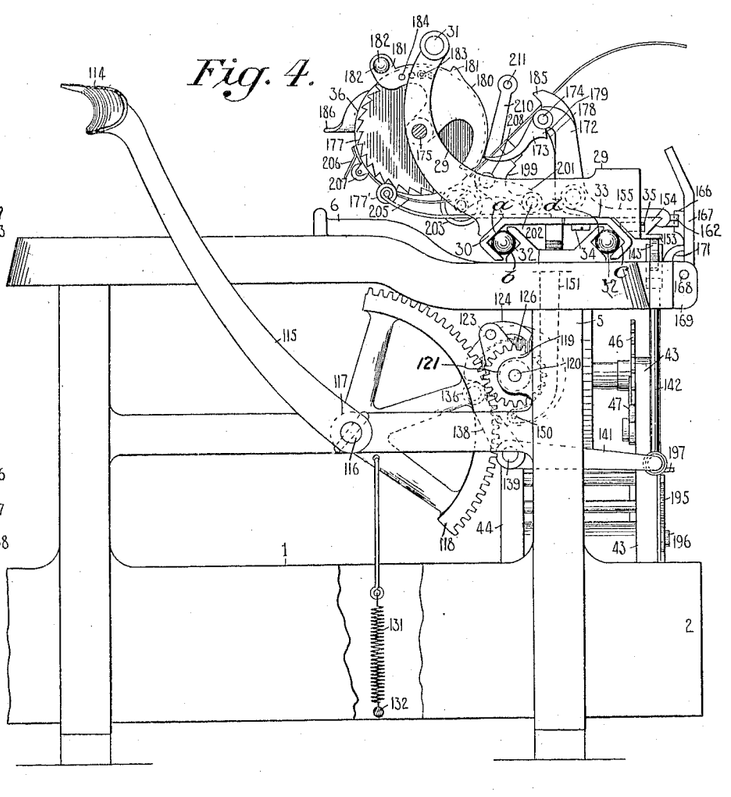
Fig. 4 is an end elevation.

The carriage is mounted on, and is supported solely by, a single rail 24 which lies flat on the top plate 6 and has race-ways 25 and 26 formed in its front and rear edges respectively. The rail 24 is secured to the top plate by two screws 27 (Fig. 3) having milled heads 28. Said screws pass through the top plate 6 and are threaded into the rail 24. The construction is such that the rail and the carriage mounted thereon may be readily removed from the machine by loosening the screws 27, and another carriage and rail of different length may be substituted for it. The carriage truck comprises two end pieces 29 which are rigidly connected together by a rail or frame-piece 30 and a frame rod 31. The rail 30 is rigidly fastened to the end pieces 29 and is formed, as shown in Fig. 1, to cover up the forward half of the rail 24. The rail 30 has a race-way formed therein which coöperates with the race-way 25 and in these coöperating race-ways run anti-friction balls or rollers 32. A second rail 33 covers the rear half of the rail 24 and has formed therein a race-way which coöperates with the race-way 26. The rail 33 is adjustably secured to the end pieces 29 by headed screws 34 which pass through slots in the rail 33 and are threaded into the end pieces 29. As shown in Figs. 3 and 4, screws 35 are threaded through depending portions of the end pieces 29 and engage the rear side of the rail 33. The ball bearings for the carriage may be adjusted by means of these screws. The two rails 30 and 33, substantially cover up the rail 24, and shield the ball bearing from dirt. The end pieces 29 of the carriage truck extend forward and upward from the rail 30 and have the platen 36 journaled therein in the usual manner. It will be seen by an inspection of Fig. 1 that the center of gravity of the carriage is forward of the forward set of rollers or balls 32; so that the weight of the carriage is sustained by downward pressure on said forward set of balls and by upward pressure on the rear set of balls. That is to say, the race part of the carriage comprises a downwardly facing bearing *a* and the opposing or stationary race part comprises an upwardly facing bearing *b*, these bearings being at the front, and the race part on the carriage also comprises at the rear an upwardly facing bearing *c* and said opposing race part at the rear comprises a downwardly facing bearing *d*; and the weight of the carriage causes a downward pressure on the parts *a* and *b* and the upward pressure on the parts *c* and *d*. Moreover, the carriage bearings are self-adjusting for wear.

Figure 7:
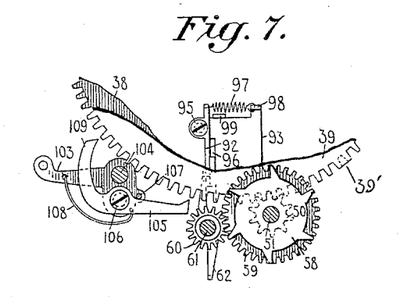
Fig. 7 is a detail view showing a portion of the carriage feed mechanism as seen from the rear, including a device for feeding the carriage toward the right.

A rack bar 37 is secured to the underside of the carriage rail 30 and said rack bar is in mesh with two gear wheels 38 and 39 which are loosely mounted side by side on a shaft 40 and extend through slots formed for the purpose in the top plate 6 and rail 24. As shown in Fig. 7 the gear wheel 39 has one tooth 39' of peculiar form to serve as a guide in placing a new carriage on the machine. This tooth may be made different from the other teeth in any suitable manner, but as here shown the peculiarity consists in making this one tooth of double width and a corresponding interdental space is of course made in the carriage rack. The purpose is to place a carriage on the machine always in such position that this peculiar tooth will mesh with the corresponding interdental space on the carriage rack. The gear wheel 39 has fixed to one face thereof a spring drum 41 in which is coiled a spring 42, the outer end of which is secured to said spring drum and the inner end of which is secured to the shaft 40, on which the spring drum 41 is journaled. The shaft 40 is journaled in two vertical frame pieces 43 and 44, which are rigidly mounted on the shelf 3, to which they are secured by screws 45 (Fig. 3) threaded into lugs rising from said shelf. The tension of the spring 42 may be regulated by means of a ratchet wheel 46 which is controlled in the usual manner by a pawl 47 pivoted on the frame piece 43. It will be perceived that the carriage is driven by the spring 42 acting through the gear wheel 39. The step by step feed of the carriage is controlled by an escapement mechanism which is geared to the gear wheel 38. The gear wheel 38 is loosely mounted on the hub of the gear wheel 39, but the freedom of motion of one of these wheels relatively to the other is limited by a screw or pin 48 (Fig. 8) which is secured to one of said gear wheels and projects into an opening 49 in the other, said opening being of greater diameter than the screw or pin, so as to admit of enough play to take up any lost motion that may exist between the teeth of said gear wheels and the teeth of the rack bar 37. When the carriage is removed from the machine, this connection between the two wheels prevents relative rotation of such wheels, so that the main spring is controlled by the escapement mechanism, whether the carriage is in position on the machine or not. The gear wheel 38 meshes with a pinion 50 which is fixed on a shaft 51 (Fig. 7) on which is rigidly mounted a squared block 52 (Figs. 1 and 2). Two beveled gears 53 and 54 are journaled on shouldered screws 55 which are threaded into the block 52. These beveled gears mesh with beveled gears 56 and 57 which are journaled on the shaft 51, the whole constituting a bevel-gear epicycloidal train. An escapement wheel 58 is rigidly mounted on the hub of the bevel-gear 56, and a gear wheel 59 is rigidly mounted on the hub of the bevel-gear 57. As best shown in Fig. 7, the gear wheel 59 meshes with a pinion 60 which is fixed on a shaft 61 which is journaled in the frame plates 43 and 44. Said shaft 61 extends through the frame piece 44 and has fixed on the end thereof in front of said frame piece a two-toothed escapement wheel 62. The construction is such that the shaft 51 is controlled by both of the escapement wheels 58 and 62, and said shaft is free to turn when either of said escapement wheels is released, and if both of said escapement wheels be released at the same time the shaft is free to turn through a distance equal to the sum of the distances permitted by the two escapements separately. In the present instance the shaft 61 is geared to move through three times the angular distance of the gear wheel 59, and the ratchet wheel 62 has two teeth while the ratchet wheel 58 has six teeth. This being the case, it will be perceived that the two escapement wheels are designed to afford the same extent of feed movement to the carriage.

The escapement wheel 62 is controlled by feed dogs which are connected with the universal bar so that said escapement wheel is under the control of the character keys. The escapement wheel 58 is controlled by feed dogs which are operated by the space key, so that when the last letter of a word is printed the key corresponding to such letter and the space key may be struck at the same time with the result that the carriage will be fed a double distance to space between words. In Fig. 1 the shaft 61 is shown broken away a short distance behind the frame piece 44 in order to show the mechanism mounted on the shaft 51.

The escapement wheel 58 is controlled by two feed dogs 63 and 64, both of which are pivoted on a rod 65 supported by the frame pieces 43 and 44. The feed dog 63 is formed on, or consists of, one arm of a bell crank lever, the other arm 66 of which is connected by a link 67 to an arm 68 projecting from a rock shaft 69 which is journaled at its rear end in the back plate 2 and at its front end in one of the frame plates 10 and which is operated by a space key 70, the stem of which is pivoted to an arm 71 projecting from said rock shaft. The dog 63 is normally out of the path of the tooth of the escapement wheel 58, as shown in Fig. 3. The dog 64 extends substantially horizontally from the rod 65 and normally lies in engagement with one of the teeth of the escapement wheel. This dog has an adjusting screw 72 threaded through it, and the lower end of said screw is in position to be engaged by an arm 73 integral with the dog 63. The construction is such that when the space key 70 is depressed the dog 63 is thrown into the path of a tooth of the escapement wheel and the dog 64 is lifted out of the path of the teeth of said wheel by the arm 75 engaging the screw 72. The amount of motion thus imparted to the dog 64 may be regulated by adjusting the screw 72. When the key 70 is released the parts are returned to normal position, withdrawing the dog 63 and permitting the dog 64 to drop into the path of the next succeeding tooth of the escapement wheel, by a spring 74 (Fig. 1) coiled about the shaft 69 and connected at one end to the frame plate 10 and at the other end to the arm 71.

Figure 9:
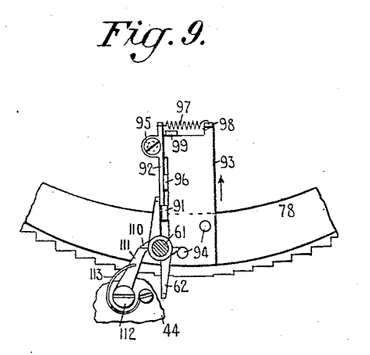
Figs. 9, 10, 11 and 12 are detail views of the escapement mechanism.
Figure 10:
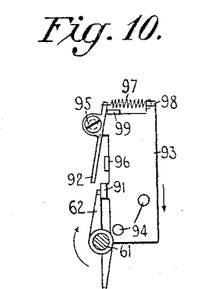

Each of the sub-levers 13, 14 has a rearwardly extending arm 75 to which is connected one end of a spring 76, the other end of which is connected to the washer 77 of the screw 20 by which the hanger 19 is secured to the segment 21. The arms 75 operate the universal bar 78. Said universal bar has the form of a stepped segment and it is mounted for parallel motion up and down. To this end two brackets 79 are secured to the front face of the universal bar (Fig. 1) near the ends thereof and each of said brackets has pivoted thereto at 80, an arm 81 which is rigidly connected to a rock shaft 82, which is journaled in brackets 83 of the top plate 6. A bracket or arm 84 is fixed to the universal bar near the middle thereof and said bracket is pivotally connected at 85 to a link 86 which is pivoted at 87 to a bracket 88 which is rigidly secured to the fixed segment 21. The link 86 is of the same length as the arms 81 and is parallel to said arms, so that said arms and link guide the universal bar for parallel motion. All of the sub-levers 13, 14 are mounted to swing in substantially vertical planes, and the universal bar is stepped on its under side, as shown in Fig. 3, and each of the arms 75 coöperates with one of the steps. In order to make the universal bar light and to avoid noise, I prefer to construct that part of said universal bar which is engaged by the arms 75 of wood or other organic material, and said universal bar is accordingly built up of two thin segmental plates 89 having a layer of wood or similar material interposed between them, the whole being connected together by rivets 90 (Fig. 3). The organic material projects beyond the metallic plates and has the steps formed therein, as clearly shown in Fig. 3. The escapement wheel 62 has its teeth projecting from its front face substantially parallel to its axis of rotation, as shown in Fig. 1. The middle portion of the universal bar lies directly in front of this escapement wheel and the feed dogs 91 and 92 are mounted directly on said universal bar, as best shown in Figs. 1 and 9. While any suitable feed dogs might be employed, yet I prefer to use the construction illustrated in the drawings, in which the fixed dog 91 consists of an ear bent up from a piece of sheet metal 93, which is secured, as by rivets 94, to the rear face of the universal bar. The loose dog 92 is pivoted on a screw 95 which is threaded into an ear of the plate 93. Said screw stands approximately over the shaft 61, so that when the universal bar is reciprocated the pivot of the loose dog moves in a direction substantially toward and from the particular tooth of the escapement wheel with which the feed dogs are coöperating at the time. In the normal position of the parts shown in Fig. 9, the loose dog 92 is engaged by a tooth of the ratchet wheel, which presses it against a stop 96, which stop consists of an ear bent up from the plate 93. The dog 92 extends a short distance above its pivot where it is connected to one end of a light spring 97, the other end of which is connected to an ear 98 bent up from the plate 93. When the universal bar and the feed dogs are raised by the depression of a key to their upper position, the spring 97 moves the loose dog 92 to the position shown in said Fig. 10, against a stop 99, which consists of an ear bent up from the plate 93. When the key is released the tooth of the escapement wheel escapes past the fixed dog 91 and the next tooth engages the loose dog 92. The escapement wheel 62 being so geared to the carriage that a single letter space movement of said carriage turns said escapement wheel through half of a complete rotation, the pressure of the tooth of the escapement wheel against the feed dogs is very light and consequently offers a very slight frictional resistance to the movement of the feed dogs, thus lessening the work thrown on the character keys by the escapement. The escapement wheel 58 is not geared up in this way, as the space key has no other work to do than that of operating said escapement, and a light touch on said key is therefore comparatively unimportant.

Figure 8:
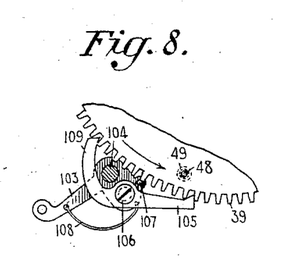
Fig. 8 is a detail view of the back-spacing mechanism.
Figures 11, 12:
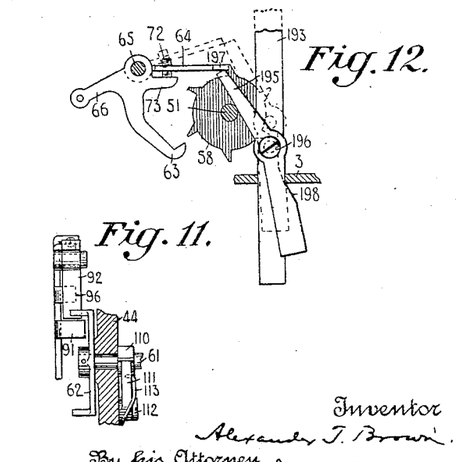

I have provided a back spacing device for imparting to the carriage a step-by-step movement toward the right. This device comprises a rock shaft 100 (Fig. 3), which is mounted in the framework and is operated by a back spacing key in the same manner as the rock shaft 69 by the space key. The shaft 100 has an arm 101 rigidly secured thereto, and said arm is connected by a link 102 with an arm 103, which is mounted on a rod or shaft 104, which is mounted in the frame plates 43 and 44. As best shown in Figs. 7 and 8, the arm 103 forms part of a rock frame on which a pawl 105 is pivoted at 106. When the parts are in their normal position shown in Fig. 7, the pawl 105 is pressed into engagement with a stop pin 107 projecting from the rock frame, by a spring 108, which is connected at one end to said pawl and at the other end to the arm 103. When the arm 103 is drawn down by the depression of the back-spacing key, the stop 107 is moved away from the pawl 105 which drops into engagement with one of the teeth of the gear wheel 38 and moves said gear wheel backward. The pawl 105 has a tail 109, which, at the end of the stroke of the pawl enters the space between two of the teeth of the gear wheel and stops the motion of all of the parts, thus positively preventing any overflow of the wheel. When the carriage is moved toward the right either by the back-spacing mechanism just described or by hand, the escapement wheel 58 turns in a direction the reverse of that in which it turns in the ordinary operation of the machine, and the loose dog 64 acts as a pawl or detent and the wheel 58 as a ratchet wheel. In order to prevent the escapement wheel 62 from turning when the back spacing mechanism is operated, the shaft 61 on which said escapement wheel is mounted has fixed thereon, just behind the frame plate 44, a two toothed ratchet wheel 110 (Figs. 9 and 11), and a pawl or detent 111 pivoted to the frame plate 44 at 112, is pressed into engagement with said ratchet wheel by a spring 113 which is connected at one end to the pawl and at the other end to the frame piece. If the escapement wheel 62 were free to turn backward when the back space mechanism is operated, both of the escapement wheels might turn backward and the motion of the gear 38 might thus be divided between the two escapement wheels, in which case the escapement wheel 58 might not turn far enough for the next tooth thereof to be caught by the dog 64.

For the purpose of moving the carriage toward the right, as, for example, to begin a new line, I provide a carriage returning handle 114. Said handle is formed on the end of a lever 115 which is fixed on the end of a rock shaft 116, which is journaled in the main frame. The shaft 116 is journaled in an elongated bearing 117 (Fig. 3) and has fixed thereto at its inner end a segmental gear 118 which meshes with a pinion 119, which is mounted on a shaft 120 which is journaled at one end in an ear or bracket 121 (Fig. 4) projecting from one of the posts 5 and at its other end in the frame piece 44. Near its inner end the shaft 120 has fixed thereto a bevel-gear 121 (Fig. 3) which meshes with a bevel-gear 122, which is journaled on the shaft 40. The hub of the bevel-gear 121 passes loosely through the gear wheel 38, and has the gear wheel 39 rigidly mounted thereon. The construction is such that if the handle 114 be depressed, the shaft 120 and the gear wheel 39 will be turned and the carriage be moved toward the right.

Figures 13, 14, 20, 21:
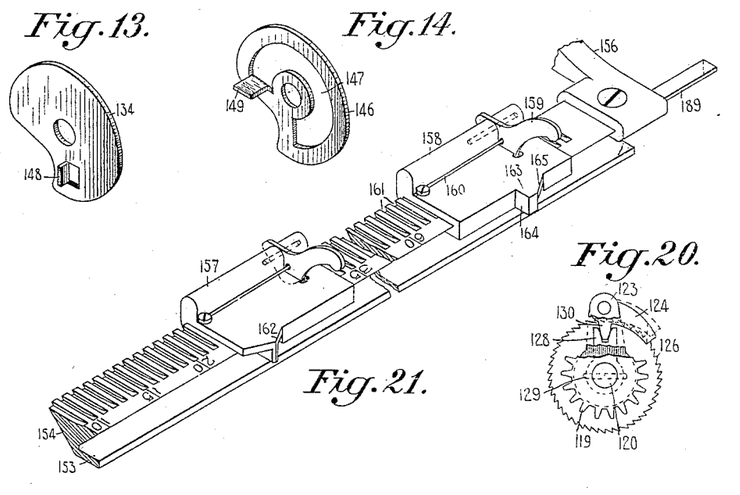
Figs. 13 to 20 are detail views of the carriage returning mechanism.
Fig. 21 is a perspective view of a bar which is mounted on the carriage.
Figure 15:
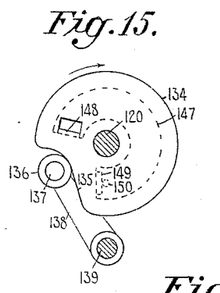
Figure 16:
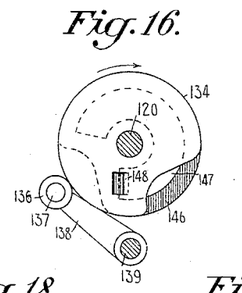
Figure 17:
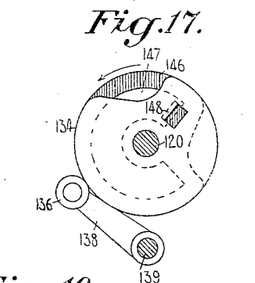
Figure 18:
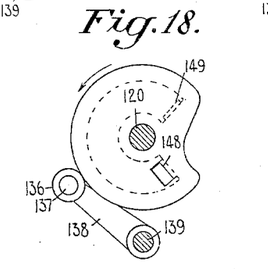
Figure 19:
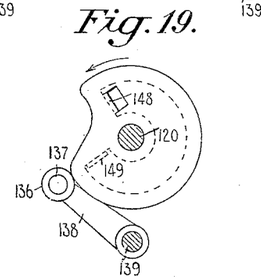

I provide a line space device which is operated by the handle 114 when said handle is used to return the carriage and which is automatically disconnected from said handle and returned to normal position when the handle is released. To this end the pinion 119 is not fixed on the shaft 120 but has a hub which is loosely mounted on said shaft and from which projects an arm 123, to the upper end of which is pivoted a pawl 124, the free end of which has a laterally projecting tooth 125 (Fig. 3) which lies over the periphery of a ratchet wheel 126, which is rigidly mounted on one end of a sleeve 127, which is loosely mounted on the shaft 120. An arm 128 (Fig. 20) lies between the arm 123 and the ratchet wheel 126 and is mounted on the shaft 120 to which it is rigidly secured by a pin 129 passing through said shaft and through the hub of said arm. As shown in Fig. 20, the arm 128 is notched at its end, and into this notch projects a tooth 130 which depends from the pawl 124. The construction is such that when the handle 114 is depressed the pinion 119 and the arm 123 connected thereto are turned toward the back of the machine and the pawl 124 is depressed into engagement with the ratchet wheel 126, as shown by full lines in Fig. 20, by the engagement of the tooth 130 with the wall of the notch in the end of the arm 128, the pinion 119 turning slightly on the shaft 120 in this operation. As soon as the pawl engages the ratchet wheel, said wheel is turned with the pinion by the pawl, and the shaft is turned with the pinion by the tooth 130. When the handle 114 is released it is slightly raised by a spring 131 (Fig. 4), which is connected at one end to a pin 132 projecting from one of the side pieces 1, and at the other end with the segment 118. When the segment is moved by the spring 131 the pinion and the arm 123 are turned toward the front of the machine and the pawl 124 is lifted into the position shown by dotted lines in Fig. 20, out of engagement with the ratchet wheel 126, by the tooth 130 pressing against one of the walls of the notch in the end of the arm 128. Any suitable means may be provided for limiting the motion of the pawl 124 in this operation. It will be perceived that there is between the shaft 120 and the pinion 119 sufficient lost motion to throw the pawl 124 into and out of engagement with the ratchet wheel 126. The sleeve 127 has a flange 133 (Fig. 3) to which is rigidly secured a cam disk 134, the outline of which is shown in Figs. 13 and 15—19, the disk being shown in normal position in Fig. 15. The disk 134 has the form of a circle concentric with the shaft 120, except that it is cut away on one side to form a sort of notch, one side 135 of which constitutes a cam. When the disk is turned, this cam operates a follower consisting of an anti-friction roller 136 which normally rests in the bottom of the notch, as shown in Fig. 15. The anti-friction roller 136 is journaled on a stud 137 projecting from an arm 138 which is fixed on one end of a rock shaft 139, which is journaled in a bracket 140 (Fig. 3), which projects from the frame piece 44. To the other end of the rock shaft 139 is fixed an arm 141 which extends toward the back of the machine and which has pivoted to its free end a rod 142 which passes loosely through an opening in the top plate 6 and has journaled on its upper end an anti-friction roller or wheel 143. The construction is such that when the cam disk 134 is turned by the ratchet wheel 126 the arm 138 is depressed, as shown in Fig. 16 and the arm 141, rod 142 and roller 143 are elevated. The roller 143 operates a yoke frame which is mounted on the carriage and which will be hereinafter described. When the pawl 124 is lifted off of the ratchet 126 by the action of the spring 131 the ratchet wheel 126, the sleeve 127 and the cam disk 134 are returned to normal position by a coiled spring 144 (Fig. 3), which is connected at its inner end to the sleeve 127 and at its outer end at 145 to the top plate 6 or to any other suitable stationary part.

As has been stated hereinbefore, the carriage of this machine is readily detachable and it is contemplated that interchangeable carriages of different lengths may be used on the machine. When a long carriage is used it may require a complete rotation of the shaft 120 or even more than a complete rotation of the said shaft, to return the carriage to its right-hand position; and I have provided means for preventing the follower 136 from dropping back into the notch in the disk 134 under these conditions. If said follower were permitted to drop back into said notch in this way, the arm 138 would be operated twice at a single operation of the handle 114 and the line space mechanism would also be operated twice. To prevent this, a disk 146 (Figs. 3, 14, 16 and 17) is loosely mounted on the shaft 120 by the side of the disk 134. The disk 146 is held against displacement toward the left (as viewed from the front of the machine) by a collar 146ª, (Fig. 3) mounted on the shaft 120. The disk 146 has substantially the same peripheral outline as the disk 134 and when the parts are in normal position, as shown in Fig. 15, the notches of the two disks register with each other and the follower 136 rests in both notches. The disk 146 is formed with a segmental slot 147 (Fig. 14) into which projects an ear 148 bent out from the face of the disk 134. When the parts stand in their normal position, shown in Fig. 15, the ear 148 is in engagement with one end wall of the segmental slot 147. When the handle 114 is depressed the disk 134 is turned in the direction of the arrow in Fig. 15, the disk 146 remaining stationary and the ear 148 moving idly in the segmental slot 147 until the position shown in Fig. 16 is reached, when the ear 148 engages the other end wall of the slot 147 and carries the disk 146 along with it. The parts are then in such position that the notch in the disk 134 is masked by the circular periphery of the disk 146, so that if the two disks move on to such position that said notch passes over the follower 136, said follower will be held in its operated position by the disk 146. The two disks may thus move together to an extreme position, such, for example, as that shown in Fig. 17, without permitting the follower to drop into the notch. When the handle is released and the pawl 124 lifted out of engagement with the ratchet wheel 126, the spring 144 moves the disk 134 in the direction of the arrow in Fig. 17, the disk 146 remaining stationary until the disk 134 reaches the position shown in Fig. 18, when the ear 148 encounters the end wall of the slot 147. In this position the notches in the two disks are again in register. After this the two disks return to normal position together and the follower again drops into the notch. In order to arrest the disks in their normal position, an ear 149 is bent outward from the face of the disk 146 and projects into the path of a pin 150 (Figs. 3 and 15) which projects from the side of a bracket 151 which depends from the top plate 6, to which it is secured by a screw 152.

It will be perceived that except for the slight lost motion between the pinion 119 and the shaft 120, the handle 114 always moves in unison with the carriage, but that when said handle is released the disks 134 and 146 and the parts connected therewith and controlled thereby return to normal position immediately.

Figure 5:
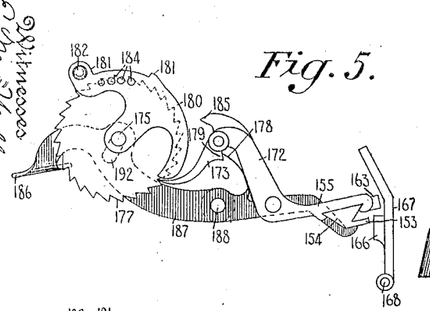
Figs. 5 and 6 are detail views of the line space mechanism as seen from the right-hand end of the machine.
Figure 6:
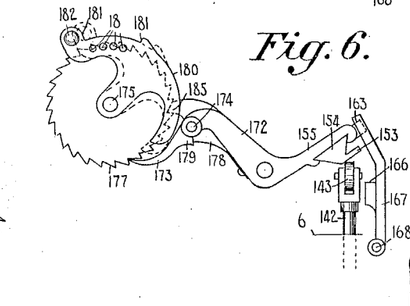

As shown in Figs. 4 and 6, the roller 143 engages the underside of a flange 153 of a yoke bar 154 which at its ends is rigidly mounted on arms 155 and 156 (Figs. 6 and 21), said arms being pivoted to the end pieces 29 of the carriage truck. The arms 155 and 156 normally lie in a substantially horizontal position, the bar 154 being mounted on the rear free ends of said arms and extending nearly from one end piece 29 to the other. The bar 154 is grooved along its rear edge, the flange 153 forming the lower side of the groove. Except for the flange 153, the bar is nearly triangular in cross section, and it has two stop pieces 157 and 158 slidably mounted thereon, dove-tail fashion. Each of the stop pieces is slotted and in this slot is pivoted a latch 159 (Fig. 21) which is pressed by a spring 160 into such position that the lower edge of said latch normally rests in one of a series of notches or transverse grooves 161 which are formed a letter space distance apart in the upper surface of the bar. The bar may be graduated on this upper surface to guide the operator in adjusting the stop pieces. The stop piece 157 has a lug 162 projecting from its rear edge and formed with oblique faces which actuate an alarm mechanism which is not shown herein. The stop piece 158 has a lug or margin stop 163 projecting from its rear edge, and said margin stop is formed with one abrupt face 164 and one oblique or cam face 165. When the bar 154 is in its normal position, the stop 163 is in position to engage a coöperating stop which consists of a lug 166 projecting from the front face of an arm 167 which is hinged on a rod 168 which is supported in ears 169 projecting from the main frame. The arm 167 may be pressed back out of the path of the stop 163 but it is normally held in its forward position by a spring 170 which is coiled about the rod 168 and presses at one end against the framework and at the other end against the arm. The forward motion of the arm 167 under the impulse of the spring 170 is limited by a stop or lug 171 (Fig. 4) projecting from the framework. The arm 167 at its upper end is bent toward the front of the machine, so that when the bar 154 is raised by the roller 143, as shown in Fig. 6, the stop 163 is in position to engage and to be arrested by said upper end of the arm; but when the bar 154 occupies the intermediate position shown in Fig. 5, the stop 163 is in an inoperative position where it will not be arrested either by the lug 166 or the upper end of the arm 167.

The arm 155, which supports one end of the bar 154, has integral therewith an upwardly and forwardly extending arm 172 to which the line space pawl 173 is pivoted at 174. The platen 36 has a shaft 175 which is journaled in the end pieces 29 of the truck and has finger wheels 176 secured upon its ends in the usual manner. A line space ratchet wheel 177 is fixed on the shaft 175 or is secured to one end of the platen 36, as usual, and the free end of the pawl 173 is pressed toward this ratchet wheel by a spring 178 which is fixed to the arm 172 and presses against the heel 179 of the pawl. As the pawl 173 is moved through the same distance at every operation of the returning mechanism, I have provided an adjustable shield 180 to regulate the extent of rotation imparted to the platen at each actuation of said pawl. The shield 180 is pivoted on the shaft 175 and is free to be rocked about said shaft to an extent which is limited by shoulders 181 which are adapted to engage a portion of the end piece 29. A handle 182 is secured to the shield 180. The shield 180 is yieldingly held in any one of several positions to which it may be adjusted, by a spring pressed pin 183 (Figs. 3 and 4) which is seated in a shouldered opening in the end piece 29 and the conical inner end of which engages in a series of holes or depressions 184 in the shield 180. In the present instance I have shown four such depressions, three of them corresponding to triple, double and single spacing respectively and the fourth to a position of the shield in which the pawl 173 makes its entire excursion without operating the ratchet wheel 177 at all. The shield 180 is shown in Fig. 4 set for double spacing. The pawl 173 normally rests on the periphery of the shield, even when said shield is set for triple spacing, so that, even in this position of the parts, there is enough lost motion between the pawl 173 and the first tooth of the ratchet wheel 177 beyond the end of the shield to permit of the bar 154 being moved to the position shown in Fig. 5 without operating the ratchet wheel. The purpose of this arrangement will appear hereinafter. The arm 172 has a portion thereof prolonged beyond the pivot 174 to form a tooth 185 which, when the arm 172 has reached the extreme end of its travel, engages one of the teeth of the ratchet wheel and positively arrests said ratchet wheel to prevent overthrow. This position of the parts is shown in Fig. 6. A detent roller 177', is mounted on a spring arm or bracket 177'', and engages the ratchet wheel 177 in the usual manner.

The bar 154 is moved to the position shown in Fig. 5 where the stop 163 is inoperative, by a carriage release key 186 formed on the end of a lever 187 which is pivoted at 188 to the left-hand end plate 29. This lever has a rearwardly extending arm which lies beneath an arm 189 (Fig. 21) projecting from the bar 154 beyond the end thereof. As shown in Fig. 1, the lever 187 has back of its pivot an ear 190 which is bent over the top of the end piece 29, and a spring 191 fixed to said end piece, engages said ear and presses the lever to normal position. The lever 187 has an elongated slot 192 through which passes the shaft 175 of the platen 36, and the motion of the lever in both directions is limited by the engagement of the ends of said slot with said shaft. I have provided means for releasing the carriage from the escapement mechanism when the key 186 is depressed. A vertically disposed bar 193 is loosely mounted in slots in the top plate 6 and the shelf 3 so as to be free to slide up and down. This bar is formed with a U-shaped upper end 194 which loosely engages the flange 153 of the bar 154, as shown in Fig. 1, so that said flange is free to slide transversely of the machine, but when it is raised or lowered the bar 193 moves up and down in unison with it. This bar has a dog or trip 195 pivoted to one side thereof on a shouldered screw 196, and the end of said dog rests beneath an arm 197 of the escapement dog 64. The arm 197 projects through an opening made for the purpose in the frame plate 43 into the path of the trip 195. Said trip is extended below its pivot and plays in the slot in the shelf 3 and is guided by one end of said slot. The edge of the depending portion of the trip has an oblique portion 198 which is below the shelf 3 when the parts are in their normal position shown by full lines in Fig. 12. When the bar 154 is raised by the release key to the position shown in Fig. 5, the trip 195 raises the dog 64 out of engagement with the ratchet wheel 58 into the position shown by dotted lines in Fig. 12, but when a greater extent of motion is imparted to the bar 154 by the carriage returning device, the oblique edge 198 of the trip 195 cams said trip over until its upper end moves away from the arm 197 and the dog 64 is thus released and is permitted to fall again into engagement with the ratchet wheel, so that when the carriage returning handle is released the dog is in position to hold the carriage in the position to which it has been moved. When said handle is so released, the bar 193 falls back to its normal position and the trip 195 again snaps under the arm 197. When the dog 64 is lifted off of the ratchet wheel by the release key, said ratchet wheel is, of course, free to turn to any extent in either direction and the carriage is therefore free to be moved by hand to any extent in either direction. The lost motion between the line space pawl and ratchet wheel is such that said ratchet wheel is not operated by the release key.

Two brackets 199 (Figs. 3 and 4) are rigidly mounted on the rail piece 30 of the carriage, and each of said brackets has a socket 200 for supporting a paper table in a well known manner. To each of these brackets an arm 201 is pivoted at 202, and these arms extend toward the platen and have journaled therein a pressure roller 203 (Fig. 4). Said arms are pressed upward to press said roller against the platen by springs 204 (Fig. 3) secured to the rail 30 and engaging the under sides of said arms. The arms 201 have spring extensions 205 which extend toward the front of the machine and are connected by a scale plate 206; and each of said arms has a pressure roller 207 journaled in ears thereof and pressed against the platen by the resilience of the arms. A shaft 208 is journaled in the brackets 199 and has flattened portions 209 which lie just above the arms 201. The shaft 208 is extended toward the left-hand end of the carriage and is journaled at its end in the left-hand frame piece 29. Near this end thereof, the shaft has secured thereto an arm 210 having at the upper free end thereof a handle 211 by which the shaft may be rocked. When this handle is drawn toward the front of the machine the arms 201 are depressed and the handle may be turned so far forward that said arms rest against the cylindrical part of the shaft. As the pressure of the arms against the shaft in this position has no tendency to turn the shaft, the parts are practically locked in that position with the rollers 203 and 207 depressed out of engagement with the platen.

The carriage feed mechanism set forth herein is not claimed in this application, but is claimed in my application Serial No. 229,485, filed Oct. 21, 1904, which is a division of the present application. The ball bearing type bar and the connections between said type bar and the keys are claimed in my pending application, Serial No. 201,260, filed Apr. 2, 1904.

What I claim as new and desire to secure by Letters Patent, is:—

1. In a typewriting machine, the combination with the main frame, of a rail detachably mounted thereon and having two raceways in the front and rear edges thereof respectively; a carriage having end pieces connected together by a strip which covers one of the race-ways of the rail and has a race-way which coöperates with said race-way in the rail; and another strip which covers the other of the race-ways in the rail and has a race-way coöperating therewith, the latter strip being adjustably mounted on the carriage.

2. In a typewriting machine, the combination of a carriage; step-by-step feed devices for said carriage; a platen mounted on said carriage; a handle for returning said carriage; means operated by said handle for imparting a line space motion to said platen, said means being automatically connected with said handle when the latter is operated and disconnected therefrom when the handle is released, and means for restoring the line spacing means to normal position independently of the handle movement after such disconnection.

3. In a typewriting machine, the combination with the main frame, of a rail mounted on said main frame and having two oppositely disposed race-ways; a carriage having two race-ways which coöperate with the race-ways of the rail, and one of which is rigidly and the other of which is adjustably connected thereto; anti-friction rollers in said race-ways; a rack bar mounted on said carriage between said carriage raceways; a gear wheel meshing with said rack bar; and an escapement mechanism for controlling said gear wheel.

4. In a typewriting machine, the combination with the carriage and the platen, of a handle; means operated by said handle for returning the carriage; a line space device; means for automatically connecting said line space device with the handle when the latter is operated and means for automatically restoring said line space device to normal position independently of the movement of the handle back to its initial position.

5. In a typewriting machine, the combination with the carriage and the platen, of a handle; means operated by said handle for returning the carriage; a cam which is operated by said handle when the latter is used to return the carriage; a line space device operated by said cam; and means for restoring said cam to normal position when said handle is released.

6. In a typewriting machine, the combination with the carriage and the platen, of a handle which moves in unison with the carriage in both directions; means operated by said handle for returning the carriage; a line space device; means whereby said line space device is automatically connected with said handle when the latter is operated to restore the carriage; and means for restoring said line space device to normal position independently of the movement of the handle back to initial position.

7. In a typewriting machine, the combination with the carriage, of a stop mounted on said carriage; a coöperating stop mounted on the main frame; a handle; means operated by said handle for moving one of said stops into the path of the other and a second means operated by the handle and coöperating with the first means for returning the carriage.

8. In a typewriting machine, the combination with the carriage, of a stop mounted thereon; a coöperating stop mounted on the main frame; a platen; a handle; means operated by said handle for moving one of said stops into the path of the other and a second means operated by the handle and coöperating with the first means for imparting a line space movement to said platen.

9. In a typewriting machine, the combination with the carriage and platen, of a stop mounted on said carriage; a coöperating stop mounted on the main frame; a handle; and connections whereby said handle moves one of said stops into the path of the other, imparts a line movement to the platen and restores the carriage.

10. In a typewriting machine, the combination with the carriage, of a carriage restoring lever; connections between said lever and said carriage including a shaft geared to said carriage, a pinion on said shaft, and a segmental gear connected with said lever and meshing with said pinion; and means extending to and operated by the connections between said lever and said carriage for imparting a line-space feed to said platen.

11. In a typewriting machine, the combination with the carriage and platen, of a carriage returning handle geared to said carriage; a cam; a line space device operated by said cam; and means whereby said cam is moved in one direction by said handle.

12. In a typewriting machine, the combination with the carriage and the platen, of a shaft geared to said carriage; a cam loosely mounted on said shaft; a ratchet connected to said cam; a pawl mounted on said shaft and normally disengaged from said ratchet; an operating handle; means for throwing said pawl into engagement with said ratchet when said handle is operated; line space mechanism operated by said cam; and means for returning said cam to normal position.

13. In a typewriting machine, the combination with the carriage and platen, of a shaft geared to said carriage; a ratchet loosely mounted on said shaft; an arm fixed to said shaft; an arm loosely mounted on said shaft and having a pawl pivoted thereto and engaging said fixed arm in such manner that when said loose arm is moved in one direction said pawl is pressed into engagement with said ratchet; a handle for moving said loose arm; a line space device operated by said ratchet; and a spring for returning said ratchet to normal position.

14. In a typewriting machine, the combination with the carriage, of a plurality of stationary stops mounted on the main frame; a stop movably mounted on the carriage and normally in position to engage one of said stationary stops; a carriage returning handle; means whereby said carriage returning handle moves said movable stop into position to engage another of said stationary stops; and a carriage release device which is adapted to move said movable stop out of position to engage either of said stationary stops.

15. In a typewriting machine, the combination with the carriage and the platen, of a plurality of stationary stops; a bar movably mounted on the carriage and having a stop mounted thereon, said bar being normally in such position that the stop thereon will engage one of said stationary stops; a carriage returning handle; means whereby said handle moves said bar to a position where the stop thereon will engage another of said stationary stops; a carriage release device which moves said bar to such position that the stop thereon will not engage any of said stationary stops; and a line space device which is operated by said bar when it is moved by said handle.

16. In a typewriting machine, the combination with the carriage, the platen and the escapement mechanism, of a member; means for moving said member different distances; means, operated by said member when moved through a certain distance, for releasing said carriage; and means, operated by said member when moved a greater distance, for imparting a line feed motion to said platen.

17. In a typewriting machine, the combination with the carriage, the platen and the escapement mechanism, of a movable member; a release key for moving said member; means, operated by said member when the latter is operated by the release key, for releasing the carriage; a carriage returning device arranged to operate said member; and a line space device operated by said member when the latter is operated by the carriage returning device.

18. In a typewriting machine, the combination with the carriage and the platen, of a bar movably mounted on said carriage; a carriage stop mounted on said bar and normally in operative position; means for moving said bar and stop to a position where the latter is inoperative; and a line space device operated by a further movement of said bar.

19. In a typewriting machine, the combination with the carriage and the platen, of a bar movably mounted on said carriage; a carriage stop mounted on said bar and normally in operative position; a release key for moving said bar and stop to an inoperative position of the latter; a line space device operated by a further movement of said bar; and a carriage returning device arranged to impart such further movement to said bar.

20. In a typewriting machine, the combination with the carriage and the platen, of a bar movably mounted on said carriage; a stop mounted on said bar and normally standing in operative position; a release key for moving said bar and stop to an inoperative position of the latter; a line space device operated by a further motion of said bar; a carriage returning device arranged to impart such further motion to said bar; and a stationary stop in the path of said carriage stop when said bar is moved by said returning device.

21. In a typewriting machine, the combination with the carriage and escapement mechanism, of a member movably mounted on said carriage; a release key for moving said member a certain distance; a carriage returning mechanism arranged to move said member through a greater distance; means operated by said member for releasing the carriage when said member is moved by the release key; and a trip device arranged to render said carriage release inoperative when said member is moved by said returning mechanism.

22. In a typewriting machine, the combination with the carriage and the escapement mechanism, of a carriage release device and a carriage returning device; and means whereby said carriage release device is rendered inoperative when the carriage returning device is operated.

23. In a typewriting machine, the combination with the carriage, of an escapement wheel; a loose dog normally in engagement with said escapement wheel; a trip for moving said loose dog out of engagement with the escapement wheel; a release key for operating said trip; a carriage returning device arranged to move said trip through a greater distance than said release key; and means for guiding said trip out of engagement with said dog when said trip is moved by said returning device.

24. In a typewriting machine, the combination with the carriage, of an escapement mechanism including a ratchet wheel and a dog; a bail mounted on the carriage and controlled by a handle; a reciprocatory bar mounted on the main frame in sliding engagement with said bail; and a trip pivoted to said bar and adapted to release said escapement wheel from said dog.

25. In a typewriting machine, the combination with the main frame, of a carriage detachably mounted on said main frame; a rack bar secured to said carriage; and a gear wheel journaled in the main frame and meshing with said rack bar and having one tooth of peculiar form to serve as a guide in placing the carriage on the machine.

26. In a typewriting machine, the combination of a to-and-fro moving carriage; a lever fulcrumed on the main frame and connected with said carriage to return the same to begin new lines; a platen; a line-space ratchet wheel; a line space pawl on said carriage; a movable bar or arm on the main frame operated by said carriage-return-lever; and a bar or arm on the carriage having a sliding connection with said bar or arm on the main frame and operating said pawl to cause line feed.

27. In a typewriting machine, the combination of a reciprocatory carriage; a platen thereon; a line space ratchet wheel connected with said platen; a line space pawl on said carriage; a movable bar or arm on said carriage for operating said pawl; a movable bar or arm on the main frame and operating said carriage bar or arm; a cam for operating said main frame bar or arm; a carriage-return lever on the main frame, and means whereby said lever actuates said cam.

28. In a typewriting machine, the combination of a carriage; a platen; a cam; a recessed disk alongside said cam; a slot and pin connection between said cam and disk whereby the circular part of the disk may mask the working face of the cam; a line space mechanism having an arm operated by said cam and overlapping the disk; means for returning said cam and disk to normal positions; carriage returning mechanism; and means whereby the return mechanism rotates said cam to cause line feed.

29. In a typewriting machine, the combination of a carriage; a platen thereon; lever-operated toothed gearing for returning said carriage to begin new lines; a cam independently movable on the same axis as a part of the said gearing; a recessed disk independently movable on the same axis; connections between said cam and disk allowing limited independent motion of the cam; line space mechanism operated by said cam and overlapping on said disk; means for returning said cam and disk to normal position; and means for connecting said cam and return mechanism as the latter is operated to return the carriage.

30. In a typewriting machine, the combination of a carriage; a platen thereon; a line space ratchet wheel connected to said platen; a rotatory cam and connections for actuating said ratchet wheel; a lever connected with said carriage to return the same to begin new lines; and a normally open clutch device for connecting said returning lever and said cam.

31. In a typewriting machine, the combination of a carriage; a platen thereon; a line space ratchet connected to said platen; a pawl-carrying bar hinged to said carriage; a lever fulcrumed on the main frame and arranged to actuate said bar; a rotatory cam mounted on the main frame and operating said lever; a lever fulcrumed on the main frame and connected with the carriage to return the same; and normally disconnected means for connecting said return lever and said cam to operate the latter to cause line feed.

32. In a typewriting machine, the combination of a carriage; a platen thereon; a lever fulcrumed on the main frame; connections whereby said lever actuates said platen for line spacing; a rotatory cam; a recessed disk alongside said cam; slot and pin connections between said cam and said disk whereby said cam has a limited motion independent of the disk, and then carries that disk along with it with the dwell thereof opposite the working part of the cam; a spring for returning the cam and disk to normal position; a toothed wheel connected with the cam; a toothed member; and carriage return mechanism provided with means for moving said toothed member into and out of engagement with said toothed wheel.

33. In a typewriting machine, the combination of the platen and its carriage, with line space mechanism mounted partly on the main frame and partly on the carriage; carriage return mechanism mounted on the main frame; and normally disconnected means for connecting said line space and return mechanisms during return motion of the carriage caused by said return mechanism.

34. In a typewriting machine, the combination of a carriage; a platen thereon; lever operated gearing for returning said carriage to begin new lines; a rotatory cam; normally disconnected means for connecting said return mechanism and said cam during the operation of the former to return the carriage; and a line feed mechanism operated by said cam.

35. In a typewriting machine, the combination of a carriage; a platen thereon; a shaft journaled on the main frame; a cam and ratchet wheel connected together and loose on said shaft; a gear loose on said shaft; an arm fast on said shaft; a pawl carried by said gear; a lost motion connection between said pawl and said arm whereby said gear actuates said shaft through said arm, and said pawl and the cam through the pawl and ratchet wheel; a line space mechanism operated by said cam; gearing connecting said shaft and carriage to return the latter; and a lever operated gear segment meshing with said loose gear.

36. In a typewriting machine, the combination of a cam and a toothed wheel rigidly connected together; an arm or lever having the same axis of motion as said cam and its wheel; a pawl or tooth pivotally connected with said arm or lever and normally disengaged from said toothed wheel; a line space mechanism operated by said cam; and carriage return mechanism of which said arm or lever forms a part and by which said pawl is moved into engagement with said toothed wheel.

37. In a typewriting machine, the combination of line space mechanism; and carriage returning mechanism normally disconnected from said line space mechanism, with means for connecting said line space and return mechanisms when the latter is operated to return the carriage.

38. In a typewriting machine, the combination of line space mechanism mounted partly on the carriage and partly on the main frame; carriage return mechanism mounted on the main frame; a letter feed escapement mechanism on the main frame; an escapement release mechanism operatively connected with the carriage part of the line space mechanism; and means whereby said return and line space mechanisms are connected and the latter operated whenever the former is operated to return the carriage.

39. In a typewriting machine, the combination of a platen and its carriage, with line space mechanism; escapement mechanism; escapement release mechanism; a carriage return mechanism and a pawl and toothed wheel connection between said return and line space mechanisms, said pawl and wheel being normally disengaged and being connected whenever the return mechanism is operated to return the carriage.

40. In a typewriting machine, the combination of a carriage, a bar or bail pivotally connected thereto; a platen; means whereby said bail rotates said platen; a letter space feed mechanism; means whereby said bail releases said feed mechanism; a carriage return mechanism; a cam and connections on the main frame for actuating said bail; and normally disengaged means for connecting said return mechanism with said cam to actuate the latter when the former is used to return the carriage.

41. In a typewriting machine, the combination of lever operated toothed gearing on the main frame for returning the carriage to begin new lines; a bail and connections on the carriage for causing line feed; a rock shaft on the main frame provided with an arm arranged to operate said bail for line feed; a cam having the same axis of motion as a part of said return mechanism; an arm on said rock shaft operated by said cam; and normally disengaged means for connecting said cam and said return-mechanism whenever the latter is operated to return the carriage to begin new lines.

42. In a typewriting machine, the combination with a carriage returning mechanism including a shaft, of a cam which is rotatable independently of said shaft; a toothed wheel connected to said cam; an arm fast on said shaft; a lever loose on said shaft; a pawl pivoted on said lever; a lost motion connection between said arm and pawl whereby the latter is thrown into and out of engagement with said toothed wheel and the lever moves said shaft and arm; and a line space mechanism operated by said cam.

43. In a typewriting machine, the combination with a carriage returning mechanism including a rotatory shaft, of a cam; a toothed wheel connected to said cam, said wheel and cam being movable independently of said shaft; a recessed disk alongside said cam; a lost motion connection between said cam and disk; a lever overlapping said disk and cam and operated by the cam; a line feed mechanism operated by said lever; a pawl; and means for engaging said pawl with said toothed wheel when said shaft is actuated to cause return motion of the carriage.

44. In a typewriting machine, the combination of a carriage-support consisting of a single rail having grooves facing in opposite directions, with a carriage connected with said grooved parts of said rail and wholly supported by said rail; means for detachably connecting said rail to the main frame; letter feed mechanism geared with the underside of said carriage; a bail pivoted on said carriage and actuating the line feed mechanism; gearing on the main frame for reversing the letter feed mechanism to return the carriage to begin new lines; a rotary cam and a rotary recessed disk having the same axis of motion; means whereby said cam has a limited motion independent of said disk to mask and unmask its own working part; a bail operating lever actuated by said cam; and normally disengaged means for connecting said cam and said carriage reversing mechanism whenever the latter is used to return the carriage to begin new lines, whereby carriages and rails of different lengths may be used with one and the same main frame, carriage reversing mechanism, cam, and lever.

45. In a typewriting machine, the combination of a carriage; a tiltable bar thereon; a margin stop on said bar; an arm on the frame provided with a lug with which said margin stop co-acts; a lever connected with said bar to tilt the same to cause the stop to clear said lug; and a line space mechanism operated by the further tilting of said bar, said arm being arranged to co-act with said stop when the bar is tilted for line spacing.

46. In a typewriting machine, the combination of a carriage; a margin stop bar pivotally connected thereto; a stop arm on the frame provided with a lug to co-act with the margin stop when the bar is in normal position, and bent to co-act therewith when line spacing occurs; a platen; means whereby said margin stop bar operates said platen for line spacing; a carriage returning mechanism; and mechanism connected with and operated by said return mechanism when the latter is used, for actuating said margin stop bar to cause line spacing.

47. In a typewriting machine, the combination of a carriage; a margin stop bar pivotally connected thereto; a stop arm on the frame provided with a lug to co-act with the margin stop when the bar is in normal position, and bent to co-act therewith when line spacing occurs; a platen; means whereby said margin stop bar operates said platen for line spacing; a carriage returning mechanism; and mechanism, connected with and operated by said return mechanism when the latter is used, for actuating said margin stop bar to cause line spacing; and a margin release lever connected with said margin stop bar.

48. In a typewriting machine, the combination with a detent of a letter space escapement mechanism, of a sliding bar; a trip arm pivoted to said bar and disengaging said detent; a bail pivoted on the carriage and engaging with said sliding bar, and means for tilting said bail.

49. In a typewriting machine, the combination of a carriage; a margin stop bar pivotally connected thereto; a stop arm on the frame provided with a lug to co-act with the margin stop when the bar is in normal position, and bent to co-act therewith when line spacing occurs; a platen; means whereby said margin stop bar operates said platen for line spacing; a carriage returning mechanism; and mechanism, connected with and operated by said return mechanism when the latter is used, for actuating said margin stop bar to cause line spacing, with a margin release lever connected with said margin stop bar; an escapement pawl; and a pawl release actuated by said margin stop bar.

50. In a typewriting machine, the combination with a carriage, a roller platen mounted on said carriage; and a line space wheel for said platen; of a carriage returning device mounted on the stationary framework and line space mechanism operated by said carriage returning device and comprising a lever which is moved always the same distance by said carriage returning device; a line space pawl carried by said lever; and a shield for holding said pawl out of engagement with said line space wheel, said shield being adjustable to cause the pawl to engage sooner or later with said wheel and being adjustable also to a position where it will prevent said pawl from engaging said wheel at all, whereby the line space mechanism is rendered inoperative by said carriage returning device.

51. The combination of a carriage provided with a race part, an opposing race part, and two sets of rolling bearings arranged between said race parts one in front of the other which constitute the sole support for the carriage, each of said race parts having a portion which bears downwardly on one set of bearings and upwardly on the other set of bearings, substantially as set forth.

52. In a typewriting machine, the combination with a laterally-movable carriage and platen, of a ball-bearing guide for the carriage comprising two sets of balls arranged at one side of the platen in substantially the same horizontal plane, and forming the sole support for the carriage, and a race part bearing downwardly on one set of balls and upwardly on the other set of balls, whereby the weight of the carriage retains the parts in proper adjustment, substantially as set forth.

53. In a typewriting machine, the combination with a laterally-movable carriage and platen, of a ball-bearing guide and support comprising two sets of balls arranged in substantially the same horizontal plane in rear of the platen, the balls forming the sole support of the carriage and platen, and being adjustable for wear by the action of gravity alone, substantially as set forth.

54. In a typewriting machine, the combination with the carriage, of a handle for returning the carriage, a stop mounted on said carriage, and a coöperating stop mounted on the main frame, one of said stops being moved by a positive motion of said handle into the path of the other.

55. In a typewriting machine, the combination with the carriage, of a stop mounted thereon, a coöperating stop mounted on the main frame, a platen, a handle, and connections whereby said handle imparts a line space feed to said platen and moves one of said stops into the path of the other.

Signed at Syracuse, in the county of Onondaga and State of New York, this 27th day of June A. D. 1904

ALEXANDER T. BROWN.

Witnesses:
E. E. CORY,
A. L. HINMAN.